US011088388B2

(12) United States Patent
An et al.

(10) Patent No.: US 11,088,388 B2
(45) Date of Patent: Aug. 10, 2021

(54) CLAMPING MEMBER AND BATTERY MODULE USING THE SAME

(71) Applicant: LG CHEM, LTD., Seoul (KR)

(72) Inventors: Hyuk An, Daejeon (KR); Gang-U Lee, Daejeon (KR); Jun-Kyu Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 215 days.

(21) Appl. No.: 15/578,083

(22) PCT Filed: Sep. 12, 2016

(86) PCT No.: PCT/KR2016/010290
§ 371 (c)(1),
(2) Date: Nov. 29, 2017

(87) PCT Pub. No.: WO2017/095001
PCT Pub. Date: Jun. 8, 2017

(65) Prior Publication Data
US 2018/0151908 A1    May 31, 2018

(30) Foreign Application Priority Data
Nov. 30, 2015 (KR) .................. 10-2015-0168280

(51) Int. Cl.
*H01M 10/04* (2006.01)
*H01M 50/20* (2021.01)
*H01M 50/244* (2021.01)

(52) U.S. Cl.
CPC ....... *H01M 10/0481* (2013.01); *H01M 50/20* (2021.01); *H01M 50/244* (2021.01); *H01M 2220/20* (2013.01)

(58) Field of Classification Search
None
See application file for complete search history.

(56) References Cited

U.S. PATENT DOCUMENTS

| 2,193,781 A | * | 3/1940 | Smith | ............... H01M 10/0413 429/209 |
| 6,196,781 B1 | * | 3/2001 | Yang | ..................... F16B 5/0233 411/384 |

(Continued)

FOREIGN PATENT DOCUMENTS

| CN | 102007618 A | 4/2011 |
| CN | 103545467 A | 1/2014 |

(Continued)

OTHER PUBLICATIONS

Asai et al., Machine Translation of JP 2012181970 (Year: 2012).*
International Search Report for PCT/KR2016/010290 (PCT/ISA/210) dated Dec. 20, 2016.

*Primary Examiner* — Ula C Ruddock
*Assistant Examiner* — Anna Korovina
(74) *Attorney, Agent, or Firm* — Birch, Stewart, Kolasch & Birch LLP

(57) ABSTRACT

Disclosed is a clamping member and a battery module using the same.
The clamping member includes a pair of pressing units configured to respectively press an upper plate and a lower plate of a battery assembly in which a plurality of batteries is stacked, so that a stacking structure of the battery assembly is fixed, and a support unit configured to support the pair of pressing units so that the upper plate and the lower plate of the battery assembly are pressed by the pair of pressing units, wherein at least one of the pair of pressing units includes a snap-fitting portion coupled to the upper plate or the lower plate by means of snap-fitting, and a screwing portion coupled to the upper plate or the lower plate coupled to the snap-fitting portion, by means of screwing, thereby fixing the battery stacking structure with excellent space (Continued)

efficiency, ensuring easy assembling of the battery module and improving durability of the battery module.

13 Claims, 5 Drawing Sheets

(56) References Cited

U.S. PATENT DOCUMENTS

| | | | |
|---|---|---|---|
| 7,700,216 B2 | 4/2010 | Suh | |
| 9,419,263 B2 | 8/2016 | Nakamori et al. | |
| 2005/0077878 A1* | 4/2005 | Carrier | B25F 5/00 320/134 |
| 2011/0024207 A1 | 2/2011 | Higashino et al. | |
| 2013/0183571 A1 | 7/2013 | Miyazaki et al. | |
| 2013/0183573 A1* | 7/2013 | Yoshioka | H01M 2/1077 429/159 |
| 2013/0273404 A1* | 10/2013 | Ochi | H01M 2/14 429/99 |
| 2014/0017538 A1* | 1/2014 | Nakamori | H01M 2/1077 429/99 |
| 2015/0093607 A1* | 4/2015 | Kuriyama | H01M 2/1223 429/54 |
| 2015/0129332 A1* | 5/2015 | Seto | H02J 7/007 180/65.1 |
| 2015/0144409 A1 | 5/2015 | Fujii | |

FOREIGN PATENT DOCUMENTS

| | | | |
|---|---|---|---|
| JP | 2012181970 A * | 9/2012 | |
| KR | 10-2004-0043432 A | 5/2004 | |
| KR | 10-2005-0045070 A | 5/2005 | |
| KR | 10-0709212 B1 | 4/2007 | |
| KR | 10-1109409 B1 | 1/2012 | |
| KR | 10-2014-0041337 A | 4/2014 | |
| KR | 10-2014-0121730 A | 10/2014 | |
| KR | 10-2015-0000090 A | 1/2015 | |
| WO | WO 2014/024431 A1 | 2/2014 | |
| WO | WO-2014024425 A1 * | 2/2014 | B60L 50/66 |

* cited by examiner

CLAMPING MEMBER AND BATTERY MODULE USING THE SAME

TECHNICAL FIELD

The present application claims priority to Korean Patent Application No. 10-2015-0168280 filed on Nov. 30, 2015 in the Republic of Korea, the disclosures of which are incorporated herein by reference.

The present disclosure relates to a clamping member and a battery module using the same, and more particularly, to a clamping member for fixing a stacking structure of a battery assembly in which a plurality of batteries is stacked, and a battery module for fixing the battery assembly by using the clamping member.

BACKGROUND ART

Generally, a secondary battery is a rechargeable battery such as a lithium ion battery, a lithium polymer battery, a nickel cadmium battery, a nickel hydrogen battery, a nickel zinc battery or the like, and an output voltage of about 2.5V to 4.2V for a unit battery. Recently, as the secondary battery is applied to devices demanding a high output voltage and a large charge capacity like an electric vehicle or a hybrid electric vehicle, a battery module of a stacking structure in which unit batteries connected in series or in parallel are stacked is widely used. Accordingly, there is an increasing demands on reducing a size of the battery module by fixing the battery stacking structure with improved space efficiency or improving durability of the battery module while ensuring easy assembling.

However, as disclosed in Korean Unexamined Patent Publication No. 10-2014-0041337 or the like, in the existing technique, the battery stacking structure is finally fixed using a shoulder bolt. Thus, the battery module should be designed to have a separate margin for forming grooves at four edges of a cartridge and upper and lower end plates of the unit battery to be coupled with the shoulder bolt, and thus the battery module has a large size and deteriorated space efficiency.

Also, as disclosed in Korean Unexamined Patent Publication No. 10-2004-0043432, in the existing technique, band-type bar plates are inserted into and coupled to the grooves at the upper and lower end plates of the battery stack to fix the battery stacking structure. Thus, if a plurality of batteries is stacked to increase the weight of the battery stacking structure, the bar plate may be separated due to the weight of the battery stack or an external impact.

DISCLOSURE

Technical Problem

The present disclosure is directed to providing a clamping member, which may ensure a small size of a battery module by fixing a battery stacking structure with excellent space efficiency, ensure easy assembling of the battery module and also improve durability of the battery module, and is also directed to providing a battery module using the clamping member.

Technical Solution

In one aspect of the present disclosure, there is provided a clamping member, comprising: a pair of pressing units configured to respectively press an upper plate and a lower plate of a battery assembly in which a plurality of batteries is stacked, so that a stacking structure of the battery assembly is fixed; and a support unit configured to support the pair of pressing units so that the upper plate and the lower plate of the battery assembly are pressed by the pair of pressing units, wherein at least one of the pair of pressing units includes: a snap-fitting portion coupled to the upper plate or the lower plate by means of snap-fitting; and a screwing portion coupled to the upper plate or the lower plate coupled to the snap-fitting portion, by means of screwing.

In an embodiment, the snap-fitting portion may have a hooking hole which is coupled to a hooking protrusion provided at the upper plate or the lower plate.

In an embodiment, the screwing portion may have an insert groove coupled to the upper plate or the lower plate, to which the snap-fitting portion is coupled, by means of screwing.

In an embodiment, the insert groove may have a U shape with an opening at a coupling side so that a screw shaft provided at the upper plate or the lower plate is inserted therein when the snap-fitting portion is coupled to the upper plate or the lower plate.

In an embodiment, at least one insert groove may be provided at both sides of the snap-fitting portion, respectively.

In an embodiment, a step may be formed between the snap-fitting, portion and the screwing portion.

In an embodiment, the support unit may have a band shape with predetermined thickness and width and a length corresponding to a stacking thickness of the battery assembly, and the support unit may have a curved portion convexly formed at a center of the width to protrude at one side in a thickness direction.

In an embodiment, the pair of pressing units and the support unit may be integrally formed.

In an embodiment, the pair of pressing units may respectively extend from both longitudinal ends of the support unit and be bent to face each other.

In an embodiment, the pair of pressing units and the support unit may be made of a metal material.

In another aspect of the present disclosure, there is also provided a battery module, comprising: the clamping member as described above; and a battery assembly in which a plurality of batteries is stacked, wherein a stacking structure of the battery assembly is fixed using the clamping member.

In an embodiment, the battery assembly may include: a battery stacking structure; and an upper plate and a lower plate respectively disposed at upper and lower ends of the battery stacking structure in a stacking direction, and at least one of the upper plate and the lower plate may include: a counterpart snap-fitting portion coupled to the snap-fitting portion of the clamping member; and a counterpart screwing portion coupled to the screwing portion of the clamping member.

In an embodiment, the counterpart snap-fitting portion may include a hooking protrusion, which is coupled to a hooking hole provided at the snap-fitting portion of the clamping member.

In an embodiment, the counterpart screwing portion may include: a screw shaft inserted into an insert groove provided at the screwing portion of the clamping member, when the counterpart snap-fitting portion is coupled to the snap-fitting portion of the clamping member; and a nut member coupled to the screw shaft to fix the clamping member.

In an embodiment, at least one screw shaft may be respectively provided at both sides of the counterpart snap-fitting portion.

In an embodiment, a step may be formed between the counterpart snap-fitting portion and the counterpart screwing portion, corresponding to the step between the snap-fitting portion and the screwing portion of the clamping member.

In an embodiment, the battery assembly may further include a bolt member screwed through the battery stacking structure, and the upper plate and the lower plate may respectively have through holes formed at points corresponding to each other so that the bolt member passes therethrough.

Advantageous Effects

In embodiments of the present disclosure, since a stacking structure of a battery assembly including a plurality of batteries stacked therein is fixed using a clamping member, it is possible to minimize the use of a shoulder bolt demanding a separate coupling space, improve space efficiency and ensure easy assembling of a battery module.

In addition, since the clamping member is coupled to the battery assembly by means of snap-fitting and screwing simultaneously, it is possible to ensure easy coupling of the clamping member, preventing the clamping member from being separated due to a weight of the battery assembly or an external impact, and improve durability of the entire battery module.

Moreover, since the clamping member is coupled to the battery assembly by means of snap-fitting, a screw shaft provided at an end plate of the battery assembly is automatically inserted into a U-shaped insert groove formed at the clamping member, thereby ensuring easy screwing of the clamping member.

In addition, since a step is formed between the snap-fit portion and the screwed portion of the end plate of the battery assembly and the clamping member so that the clamping member is supported by the step, it is possible to prevent the clamping member from being separated more effectively.

Further, it would be obviously understood from the following description by those skilled in the art that the embodiments according to the present disclosure can also solve various technical objects not mentioned above.

BEST MODE

Hereinafter, embodiments of the present disclosure will be described in detail with reference to the accompanying drawings in order to clearly explain solutions to the technical objects of the present disclosure. However, in the present disclosure, any explanation of the prior art may be omitted if it is regarded to render the subject matter of the present disclosure vague. Also, the terms used herein are defined in consideration of functions in the present disclosure and can be varied depending on the intention of a designer, a manufacturer or the like or according to custom. Therefore, the terms should be defined based on the overall disclosure of the specification.

Figure 1:
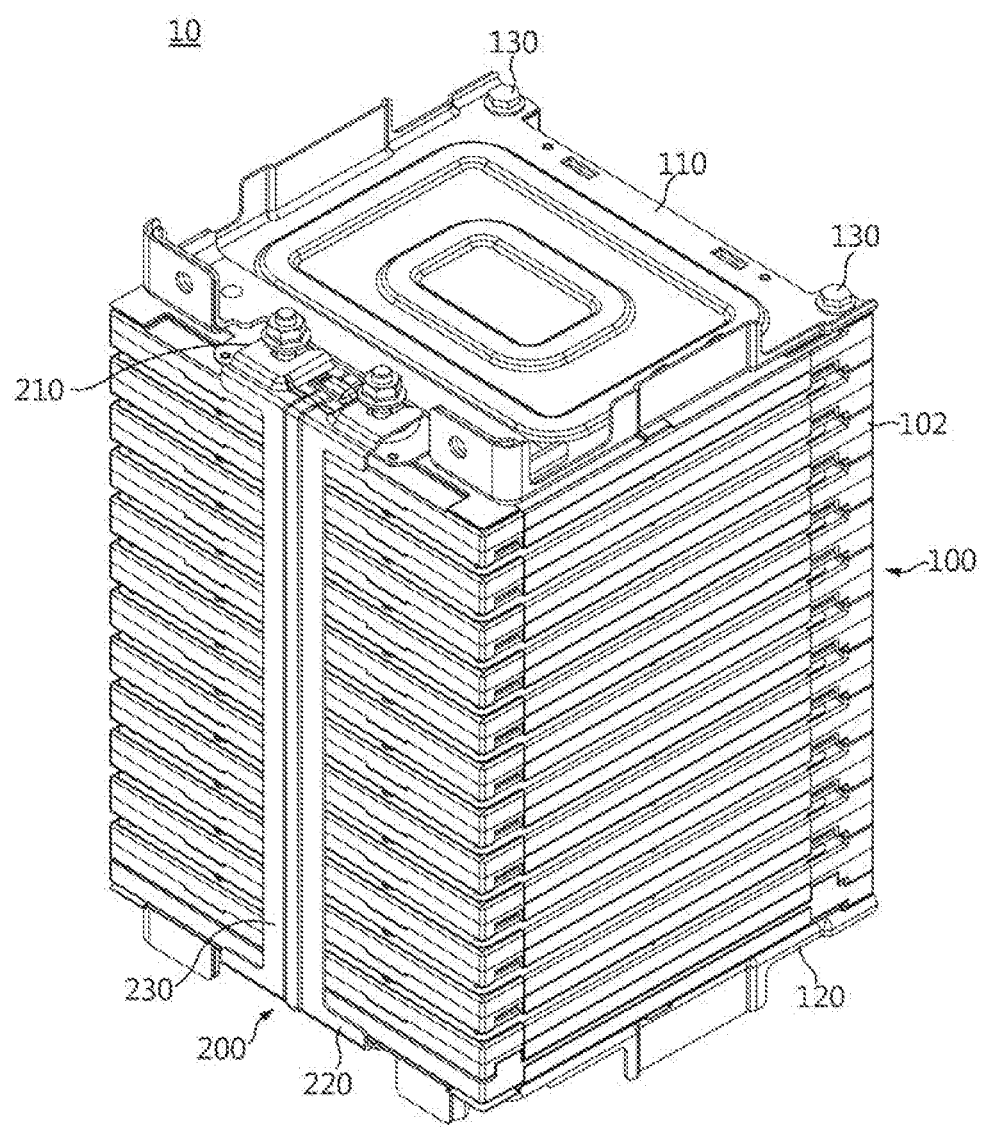
FIG. 1 is a perspective view showing a battery module according to an embodiment of the present disclosure.

FIG. 1 is a perspective view showing a battery module according to an embodiment of the present disclosure.

As shown in FIG. 1, a battery module 10 according to an embodiment of the present disclosure includes a battery assembly 100 of a stacking structure in which a plurality of batteries is stacked, and a clamping member 200. The battery assembly 100 includes a battery stacking structure 102 in which a plurality of battery cartridges, each accommodating one or more unit batteries, is stacked, and a pair of end plates, namely an upper plate 110 and a lower plate 120 respectively disposed at upper and lower ends of the battery stacking structure 102 in a stacking direction. In addition, the battery assembly 100 may further include a bolt member 130 screwed through the battery stacking structure 102.

Meanwhile, the clamping member 200 includes a pair of pressing units 210, 220 and a support unit 230. The pair of pressing units 210, 220 respectively presses the upper plate 110 and the lower plate 120 of the battery assembly 100 to fix the stacking structure of the battery assembly 100. The support unit 230 supports the pair of pressing units 210, 220 so that the upper plate 110 and the lower plate 120 of the battery assembly 100 are pressed by the pair of pressing units 210, 220.

Figure 2:
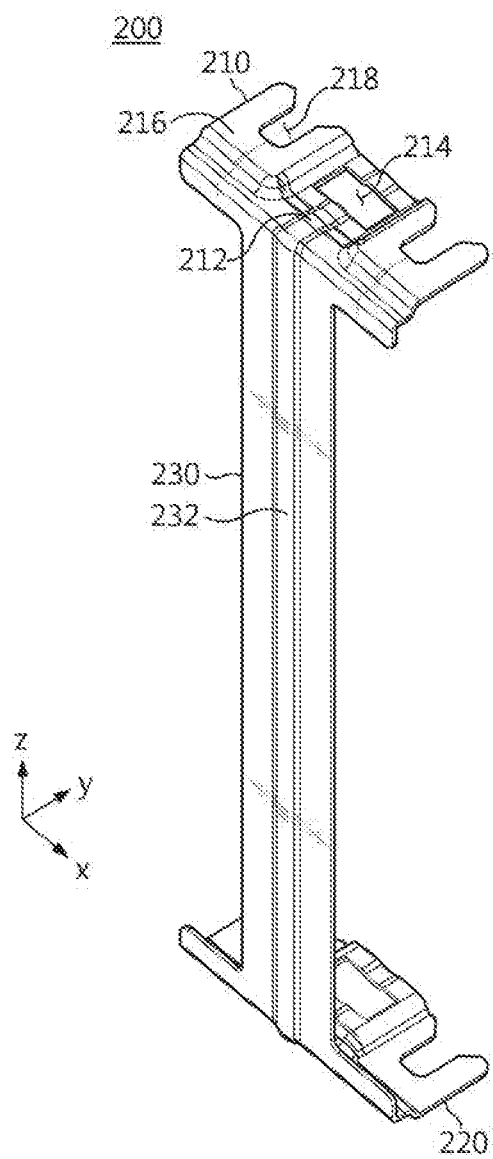
FIG. 2 is a perspective view showing a clamping member according to an embodiment of the present disclosure.
Figure 3:
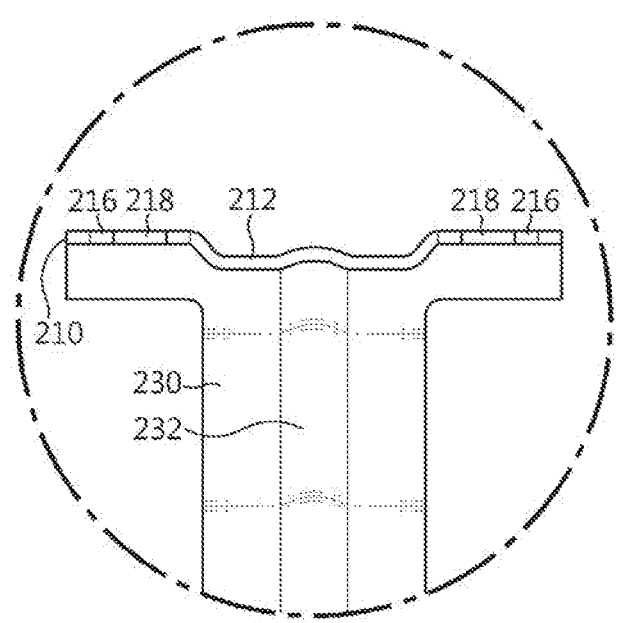
FIG. 3 is a front view showing the clamping member of FIG. 2.

FIGS. 2 and 3 are a perspective view and a front view showing a clamping member according to an embodiment of the present disclosure, respectively.

As shown in FIGS. 2 and 3, the clamping member 200 according to an embodiment of the present disclosure includes a pair of pressing units 210, 220 and a support unit 230 supporting the pair of pressing units 210, 220. At least one of the pair of pressing units 210, 220 includes a snap-fitting portion 212 and a screwing portion 216. In this case, the snap-fitting portion 212 is coupled to the end plate, namely the upper plate 110 or the lower plate 120 of the battery assembly 100, by means of snap-fitting. As explained later, if a predetermined hooking protrusion is provided at the end plates 110, 120 of the battery assembly 100, the snap-fitting portion 212 may have a hooking hole 214 coupled to the hooking protrusion. In another embodiment, if a predetermined hooking groove is formed in the end plates 110 120 of the battery assembly 100, the snap-fitting portion 212 may also have a hooking protrusion coupled to the hooking groove.

In addition, the screwing portion 216 is coupled to the upper plate 110 or the lower plate 120 of the battery assembly 100, to which the snap-fitting portion 212 is coupled, by means of screwing. For this, the screwing portion 216 may have an insert groove 218 which is coupled to the upper plate 110 or the lower plate 120 by means of screwing. In this case, the insert groove 218 may have a U shape with an opening at a coupling side so that a screw shaft provided at the upper plate 110 or the lower plate 120 of the battery assembly 100 is automatically inserted therein when the snap-fitting portion 212 is coupled to the upper plate 110 or the lower plate 120. In addition, at least one insert groove 218 may be provided at both sides of the snap-fitting portion 212, respectively. As described above, the clamping member 200 according to the present disclosure is simultaneously snap-fit and screwed to the battery assembly 100, thereby ensuring easy coupling, and also it is possible to prevent the clamping member 200 from being separated due to a weight of the battery assembly 100 or an external impact. In addition, a step may be formed between the snap-fitting portion 212 and the screwing portion 216. Since the pressing unit 210, 220 of the clamping member 200 are coupled to the upper plate 110 or the lower plate 120 of the battery assembly 100 with a step, when a vibration or impact occurs in a lateral direction (in an x-axis direction), the clamping member 200 is supported by the step, thereby preventing the clamping member from being separated more effectively.

Meanwhile, support unit 230 may have a band shape with predetermined thickness and width and a length corresponding to a stacking thickness of the battery assembly 100, and may also have a curved portion 232 convexly formed at a center of the width to protrude at one side in a thickness direction (in a y-axis direction). The curved portion 232 may be formed by means of beading, and the elastic strength of the support unit 230 may be further improved in comparison to the case where the support unit 230 has a simple flat plate shape.

The pair of pressing units 210, 220 and the support unit 230 may be formed to be integrated with each other and may also be made of a metal material with great elastic strength and high thermal conductivity. In this case, the pair of pressing units 210, 220 respectively extend from both ends of the support unit 230 in a length direction (in a z-axis direction) and are bent to face each other.

The battery module 10 according to the present disclosure fixes the stacking structure of the battery assembly 100 using the clamping member 200 as described above.

Figure 4:
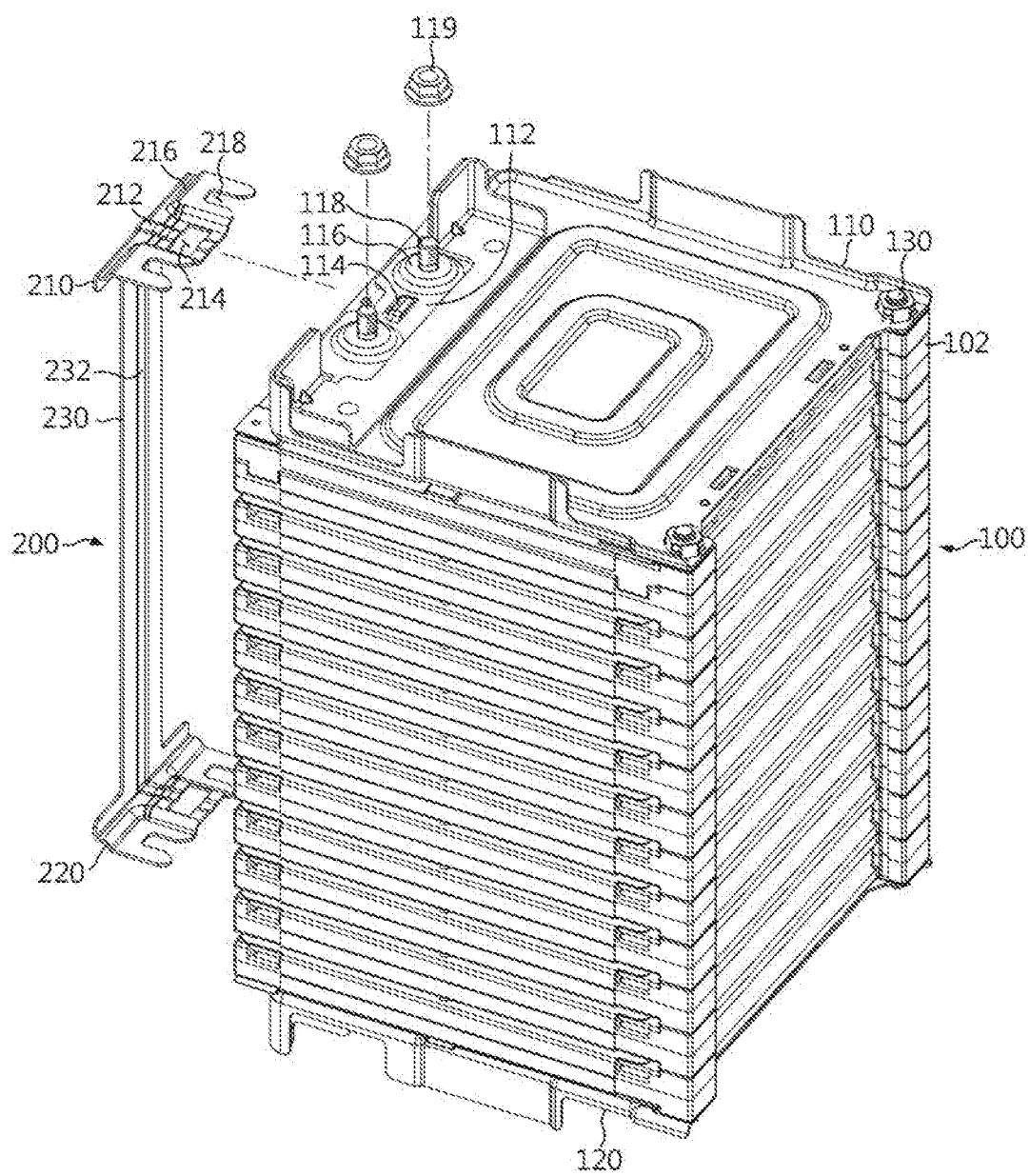
FIG. 4 is a diagram showing a coupling state of the battery module and the clamping member according to an embodiment of the present disclosure.
Figure 5:
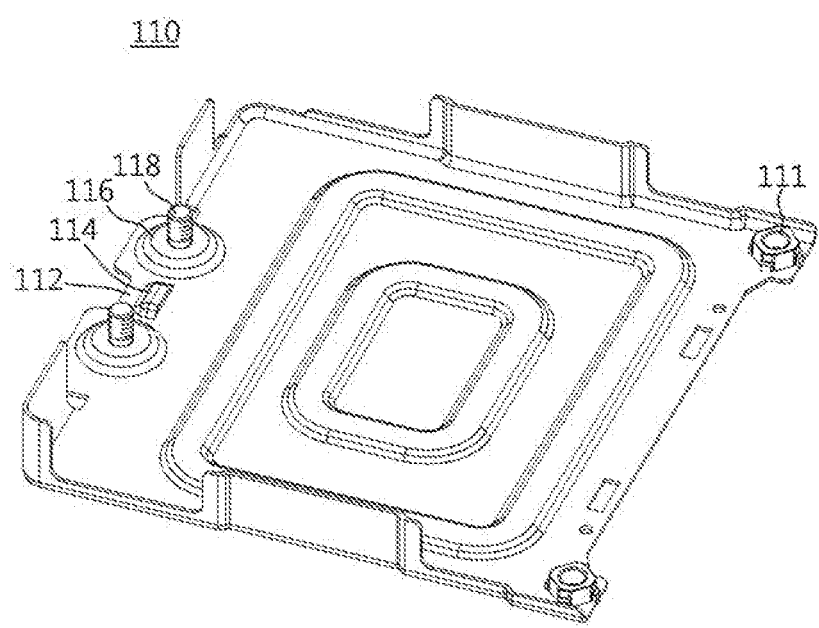
FIG. 5 is a perspective view showing an upper plate of a battery module according to an embodiment of the present disclosure.

FIG. 4 is a diagram showing a coupling state of the battery module and the clamping member according to an embodiment of the present disclosure. FIG. 5 is a perspective view showing an upper plate of a battery module according to an embodiment of the present disclosure.

As shown in FIGS. 4 and 5, the clamping member 200 is coupled to the end plates 110, 120 of the battery assembly 100 by means of the pressing units 210, 220 to fix the stacking structure of the battery assembly 100. For this, at least one of the upper plate 110 and the lower plate 120 serving as end plates of the battery assembly 100 includes a counterpart snap-fitting portion 112 coupled to the snap-fitting portion 212 of the clamping member 200, and a counterpart screwing portion 116 coupled to the screwing portion 216 of the clamping member 200. At this time, the counterpart snap-fitting portion 112 may include a hooking protrusion 114 coupled to the hooking hole 214 provided at the snap-fitting portion 212 of the clamping member 200. In another embodiment, if the snap-fitting portion 212 of the clamping member 200 has a hooking protrusion, the counterpart snap-fitting portion 112 of the end plate 110 may have a coupling groove coupled to the corresponding hooking protrusion.

In addition, when the counterpart snap-fitting portion 112 is coupled to the snap-fitting portion 212 of the clamping, member 200, the counterpart screwing portion 116 may include a screw shaft 118 inserted into the insert groove 218 provided at the screwing portion 216 of the clamping member 200, and a nut member 119 coupled to the screw shaft 118 to fix the clamping member 200. In this case, at least one screw shaft 118 may be provided at both sides of the counterpart snap-fitting portion 112, respectively, corresponding to the insert groove 218 of the clamping member 200. In addition, the counterpart snap-fitting portion 112 and the counterpart screwing portion 116 may have a step between them, corresponding to the step between the snap-fitting portion 212 and the screwing portion 216 of the clamping member 200.

In more detail, if the clamping member 200 is coupled to the battery assembly 100 by means of snap-fitting, for example, the hooking protrusion 114 provided at the upper plate 110 of the battery assembly 100 is located in the hooking hole 214 provided at the upper pressing unit 210 of the clamping member 200, and simultaneously, the screw shaft 118 of the upper plate 110 is automatically located in the insert groove 218 through the U-shaped insert groove 218 of the clamping member 200. After that, if the nut member 119 is coupled to the screw shaft 118, the clamping member 200 is completely coupled. If the upper and lower pressing units 210, 220 of the clamping member 200 are shaped corresponding to each other and also the upper and lower plates 110, 120 of the battery assembly 100 are shaped corresponding to each other, the lower pressing unit 220 of the clamping member 200 and the lower plate 120 of the battery assembly 100 may also be coupled in the above way.

Meanwhile, the battery module 10 according to an embodiment of the present disclosure may fix the stacking structure of the battery assembly 100 by using the clamping member 200 and the bolt member 130 such as a shoulder bolt simultaneously. For example, one side of the battery assembly 100 may be fixed by coupling the clamping member 200 thereto, and the other side of the battery assembly 100 may be fixed by coupling the bolt member 130 thereto. In this case, the upper plate 110 and the lower plate 120 of the battery assembly 100 may have through holes 111 at locations corresponding to each other so that the bolt member 130 may pass therethrough.

As described above, in embodiments of the present disclosure, since a stacking structure of a battery assembly including a plurality of batteries stacked therein is fixed using a clamping member, it is possible to minimize the use of a shoulder bolt demanding a separate coupling space, improve space efficiency and ensure easy assembling of a battery module. In addition, since the clamping member is coupled to the battery assembly by means of snap-fitting and screwing simultaneously, it is possible to ensure easy coupling of the clamping member, preventing the clamping member from being separated due to a weight of the battery assembly or an external impact, and improve durability of the entire battery module. Moreover, since the clamping member is coupled to the battery assembly by means of snap-fitting, a screw shaft provided at an end plate of the battery assembly is automatically inserted into a U-shaped insert groove formed at the clamping member, thereby ensuring easy screwing of the clamping member. In addition, since a step is formed between the snap-fit portion and the screwed portion of the end plate of the battery assembly and the clamping member so that the clamping member is supported by the step, it is possible to prevent the clamping member from being separated more effectively. Further, it would be obviously understood from the following description by those skilled in the art that the embodiments according to the present disclosure can also solve various technical objects not mentioned above.

Heretofore, the embodiments of the present disclosure have been described in detail. However, it will be clearly understood by those skilled in the art that various modifications can be made within the scope of the present disclosure. Therefore, the embodiments should not be interpreted restrictively but illustrative. In other words, the true scope of the present disclosure is defined in the appended claims, and its equivalents and modifications should be entirely considered as falling within the scope of the present disclosure.

What is claimed is:

1. A clamping member, comprising:
a pair of pressing units configured to respectively press an upper plate and a lower plate of a battery assembly in which a plurality of batteries is stacked, so that a stacking structure of the battery assembly is fixed; and
a support unit configured to support the pair of pressing units so that the upper plate and the lower plate of the battery assembly are pressed by the pair of pressing units, the pair of pressing units respectively extend from both longitudinal ends of the support unit and are bent to face each other such that portions thereof extend parallel to each other and perpendicular to the support unit,
wherein at least one of the pair of pressing units includes, in the parallel portion that extends perpendicular to the support unit:
a snap-fitting portion coupled to the upper plate or the lower plate by means of snap-fitting; wherein a step is formed between the snap-fitting portion and the screwing portion, and
a screwing portion coupled to the upper plate or the lower plate coupled to the snap-fitting portion, by means of screwing, the screwing portion having an insert groove coupled to the upper plate or the lower plate, to which the snap-fitting portion is coupled, by means of screwing, and
wherein the insert groove has a U shape with an opening at a coupling side so that a screw shaft provided at the upper plate or the lower plate is insertable therein when the snap-fitting portion is coupled to the upper plate or the lower plate.

2. The clamping member according to claim 1, wherein the snap-fitting portion has a hooking hole which is coupled to a hooking protrusion provided at the upper plate or the lower plate.

3. The clamping member according to claim 1, wherein the insert groove is provided as a pair of insert grooves arranged at opposite sides of the snap-fitting portion.

4. The clamping member according to claim 1, wherein the support unit has a band shape with predetermined thickness and width and a length corresponding to a stacking thickness of the battery assembly, and the support unit has a curved portion convexly formed at a center of the width to protrude at one side in a thickness direction.

5. The clamping member according to claim 4, wherein the pair of pressing units and the support unit are integrally formed.

6. The clamping member according to claim 5, wherein the pair of pressing units and the support unit are made of a metal material.

7. A battery module, comprising:
the clamping member defined in claim 1; and
the battery assembly in which the plurality of batteries is stacked,
wherein the stacking structure of the battery assembly is fixed using the clamping member.

8. The battery module according to claim 7, wherein the battery assembly includes:
the stacking structure; and
the upper plate and the lower plate respectively disposed at upper and lower ends of the stacking structure in a stacking direction,
wherein at least one of the upper plate and the lower plate includes:
a counterpart snap-fitting portion coupled to the snap-fitting portion of the clamping member; and
a counterpart screwing portion coupled to the screwing portion of the clamping member.

9. The battery module according to claim 8, wherein the counterpart snap-fitting portion includes a hooking protrusion, which is coupled to a hooking hole provided at the snap-fitting portion of the clamping member.

10. The battery module according to claim 8, wherein the counterpart screwing portion includes:
the screw shaft being inserted into the insert groove provided at the screwing portion of the clamping member, when the counterpart snap-fitting portion is coupled to the snap-fitting portion of the clamping member; and
a nut member coupled to the screw shaft to fix the clamping member.

11. The battery module according to claim 10, wherein the screw shaft is provided in plurality such that a pair of screw shafts are provided at opposite sides of the counterpart snap-fitting portion.

12. The battery module according to claim 11, wherein a step is formed between the counterpart snap-fitting portion and the counterpart screwing portion, corresponding to the step between the snap-fitting portion and the screwing portion of the clamping member.

13. The battery module according to claim 8, wherein the battery assembly further includes a bolt member screwed through the stacking structure, and
wherein the upper plate and the lower plate respectively have through holes formed at points corresponding to each other so that the bolt member passes therethrough.

* * * * *